United States Patent
Glen et al.

(10) Patent No.: US 8,390,687 B2
(45) Date of Patent: Mar. 5, 2013

(54) AUTOMATED COMPLIANCE TESTING FOR VIDEO DEVICES

(75) Inventors: David Glen, Toronto (CA); Betty Luk, Thornhill (CA)

(73) Assignee: ATI Technologies ULC, Markham, Ontario (CA)

( * ) Notice: Subject to any disclaimer, the term of this patent is extended or adjusted under 35 U.S.C. 154(b) by 1356 days.

(21) Appl. No.: 12/050,540

(22) Filed: Mar. 18, 2008

(65) Prior Publication Data

US 2008/0231711 A1 Sep. 25, 2008

Related U.S. Application Data

(60) Provisional application No. 60/895,645, filed on Mar. 19, 2007.

(51) Int. Cl.
*H04N 17/00* (2006.01)
(52) U.S. Cl. .................................. 348/192; 348/181
(58) Field of Classification Search .................. 348/192, 348/180, 181, 189, 193, 194; *H04N 17/00, H04N 17/02*
See application file for complete search history.

(56) References Cited

U.S. PATENT DOCUMENTS

| 6,008,836 | A | 12/1999 | Bruck et al. |
| 6,297,845 | B1 | 10/2001 | Kuhn et al. |
| 6,747,688 | B1 | 6/2004 | Kang |
| 6,839,055 | B1 | 1/2005 | Nguyen |
| 7,006,130 | B2 | 2/2006 | Harshbarger, Jr. et al. |
| 2006/0041920 | A1 | 2/2006 | Chaney |
| 2010/0020179 | A1* | 1/2010 | Horan et al. ................. 348/181 |

FOREIGN PATENT DOCUMENTS

| WO | WO 03/032651 A1 | 4/2003 |
| WO | WO 2006/118964 A2 | 11/2006 |

OTHER PUBLICATIONS

PCT International Search Report for PCT/CA2008/000512 (PCT/ISA/210), Jun. 17, 2008, ISA/CA, Gatineau, Quebec.
"DisplayPort Standard, Version 1," Video Electronics Standards Association (VESA), May 2006, Milpitas, CA.
Supplementary European Search Report for Application No. EP 08733616.0, Search Report completed Jun. 7, 2010.

* cited by examiner

*Primary Examiner* — Sherrie Hsia
(74) *Attorney, Agent, or Firm* — Faegre Baker Daniels LLP

(57) ABSTRACT

A method of automated video device testing, and source and sink video devices are disclosed. A test signal may be provided by way of a video link from a video source to a video sink, over a video link extending therebetween. The method includes receiving on the video link a request from the video sink to provide the test signal; identifying based on the request, a requested test signal; providing the requested test signal from the video source to the video sink over the video link. In another embodiment, a video sink may be queried over a video link to determine a metric describing at least a portion of know video signal, as received and determined at the video sink to verify integrity of the video signal at the video sink.

20 Claims, 14 Drawing Sheets

| DisplayPort Address | Definition | Read/Write over AUX Ch. |
|---|---|---|
| 00201h | DEVICE_SERVICE_IRQ_VECTOR<br>Bit 0=RESERVED for<br>REMOTE_CONTROL_COMMAND_PENDING<br>When this bit is set to 1, Source Device shall read the Device Services Field for REMOTE_CONTROL_COMMAND_PASS_THROUGH.<br><br>Bit 1=AUTOMATED_TEST_REQUEST<br>When this bit is set to 1, Source Device shall read Addresses 00218h-0027Fh for requested link test.<br><br>Bit 2=CP_IRQ<br>This bit is used by an optional content protection system.<br><br>Bits 5:3=RESERVED. Read all 0's<br><br>Bit 6=SINK_SPECIFIC_IRQ<br>Usage is vendor-specific.<br><br>Bit 7=RESERVED. Read 0. | Read only |
| Test Request Field | | |
| 00218h | TEST_REQUEST<br>Test requested by the Sink device. All other values reserved.<br><br>Bit 0=TEST_LINK_TRAINING<br>0=no link training test requested<br>1=link training test requested. See TEST_LINK_RATE and TEST_LANE_COUNT for link rate and link width respectively.<br><br>Bit 1=TEST_PATTERN<br>0=no test pattern requested<br>1=test pattern requested<br><br>Bit 2=TEST_EDID_READ<br>0=no EDID read test requested<br>1=EDID read test requested. Checksum of the last EDID block read is written to TEST_EDID_CHECKSUM. Source will also send color square test pattern.<br><br>Bits 7:3=RESERVED. Read all 0's | Read only |

FIG. 4A

| | | |
|---|---|---|
| 00219h | TEST_LINK_RATE<br>Bits 7:0=TEST_LINK_RATE<br>06h=1.62Gbps<br>0Ah=2.7Gbps | Read only |
| 00220h | TEST_LANE_COUNT<br>Bits 4:0=TEST_LANE_COUNT<br><br>All other values reserved.<br><br>1h=one lane<br>2h=two lanes<br>4h=four lanes<br><br>Bits 7:5=RESERVED. Read all 0's | Read only |
| 00221h | TEST_PATTERN<br>Test pattern requested by the Sink device<br><br>01h=color ramps<br>02h=black and white vertical lines<br>03h=color square | Read only |
| 00222h-00223h | TEST_H_TOTAL<br>Horizontal total of transmitted video stream in pixel count<br>00222h Bits 7:0=TEST_H_TOTAL Bits15:8<br>00223h Bits 7:0=TEST_H_TOTAL Bits7:0 | Read only |
| 00224h-00225h | TEST_V_TOTAL<br>Vertical total of transmitted video stream in line count<br>00224h Bits 7:0=TEST_V_TOTAL Bits15:8<br>00225h Bits 7:0=TEST_V_TOTAL Bits7:0 | Read only |
| 00226h-00227h | TEST_H_START<br>Horizontal active start from Hsync start in pixel count<br>00226h Bits 7:0=TEST_H_START Bits15:8<br>00227h Bits 7:0=TEST_H_START Bits7:0 | Read only |
| 00228h-00229h | TEST_V_START<br>Vertical active start from Vsync start in line count<br>00228h Bits 7:0=TEST_V_START Bits15:8<br>00229h Bits 7:0=TEST_V_START Bits7:0 | Read only |
| 0022Ah-0022Bh | TEST_HSYNC<br>Hsync width in pixel count<br>0022A Bit7=TEST_HSYNC_POLARITY<br>0022A Bits6:0=TEST_HSYNC_WIDTH Bits14:8<br>0022B Bits7:0=TEST_HSYNC_WIDTH Bits7:0 | Read only |

FIG. 4B

| | | |
|---|---|---|
| 0022Ch-0022Dh | TEST_VSYNC<br>Vsync width in line count<br>0022C Bit7=TEST_VSYNC_POLARITY<br>0022C Bits6:0=TEST_VSYNC_WIDTH Bits14:8<br>0022D Bits7:0=TEST_VSYNC_WIDTH Bits7:0 | Read only |
| 0022Eh-0022Fh | TEST_H_WIDTH<br>Active video width in pixel count<br>0022Eh Bits7:0=TEST_H_WIDTH Bits15:8<br>0022Eh Bits7:0=TEST_H_WIDTH Bits7:0<br><br>E.g. 0x400=1024 active | Read only |
| 00230h-00231h | TEST_V_HEIGHT<br>Active video height in line count<br>00230h Bits7:0=TEST_V_HEIGHT Bits15:8<br>00231h Bits7:0=TEST_V_HEIGHT Bits7:0<br><br>E.g. 0x300=768 active | Read only |
| 00232h-00233h | TEST_MISC<br>0023h Bits7:0 are the same definition as the miscellaneous field in the main stream attribute data.<br><br>00232h Bit0=TEST_SYNCHRONOUS_CLOCK<br>0=Link clock and stream clock asynchronous<br>1=Link clock and stream clock synchronous<br><br>00232h Bits2:1=TEST_COLOR_FORMAT<br>00=RGB<br>01=YCbCr422<br>10=YCbCr444<br>11=Reserved<br><br>00232h Bit3=TEST_DYNAMIC_RANGE<br>0=VESA range (from 0 to the maximum)<br>1=CEA range (as defined in CEA/EIA-861C Section 5)<br><br>00232h Bit4=TEST_YCBCR_COEFFICIENTS<br>0=ITU601<br>1=ITU709<br><br>00232h Bits7:5=TEST_BIT_DEPTH<br>Bit depth per color/component<br>000=6 bits<br>001=8 bits<br>010=10 bits<br>011=12 bits<br>100=16 bits<br>101, 110, 111=Reserved | Read only |

FIG. 4C

| | | |
|---|---|---|
| | 00233h Bit0=TEST_REFRESH_DENOMINATOR<br>0=1<br>1=1.001<br><br>00233h Bit1=TEST_INTERLACED<br>0=non-interlaced<br>1=interlaced<br><br>00233h Bits7:2=RESERVED. Read all 0's | |
| 00234h | TEST_REFRESH_RATE_NUMERATOR<br>Indicates the refresh rate requested by the Sink device<br>E.g. 60=60Hz numerator<br><br>Refresh rate=TEST_REFRESH_RATE_NUMERATOR/<br>TEST_REFRESH_RATE_DENOMINATOR | Read only |
| 00235h-0025Fh | RESERVED for test automation extensions | Read all 0's |
| 00260h | TEST_RESPONSE<br><br>Bit 0=TEST_ACK<br>0=writing zero has no effect on TEST_REQ state<br>1=positive acknowledgement of TEST_REQ. Clears TEST_REQ interrupt flag and indicates to sink that source has started requested test mode.<br><br>Bit 1=TEST_NAK<br>0=writing zero has no effect on TEST_REQ state<br>1=negative acknowledgement of TEST_REQ. Clears TEST_REQ interrupt flag and indicates to sink that source will not start requested test mode.<br><br>Bit 2=TEST_EDID_CHECKSUM_WRITE<br>0=no write to TEST_EDID_CHECKSUM<br>1=EDID checksum has been written to TEST_EDID_CHECKSUM<br><br>Bits 7:3=RESERVED. Read all 0's | Write |
| 00261h | TEST_EDID_CHECKSUM<br>In the TEST_EDID mode, the checksum of the last EDID block that was read is written here. | Write |

FIG. 4D

| DisplayPort Address | Definition | Read/Write over AUX Ch. |
|---|---|---|
| Test Request Field – Sink | | |
| 00240h-00241h | TEST_CRC_R_Cr<br>Stores the 16 bit CRC value of the R or Cr component.<br>00240h bits 7:0=CRC value bits 7:0<br>00241h bits 7:0=CRC value bits 15:8 | Read only |
| 00242h-00243h | TEST_CRC_G_Y<br>Stores the 16 bit CRC value of the G or Y component.<br>00242h bits 7:0=CRC value bits 7:0<br>00243h bits 7:0=CRC value bits 15:8 | Read only |
| 00244h-00245h | TEST_CRC_B_Cb<br>Stores the 16 bit CRC value of the B or Cb component.<br>00244h bits 7:0=CRC value bits 7:0<br>00245h bits 7:0=CRC value bits 15:8 | Read only |
| 00246h | TEST_SINK_MISC<br><br>Bits 3:0=TEST_CRC_COUNT<br>4 bit wrap counter which increments each time the TEST_CRC_x_x are updated. Reset to 0 when TEST_SINK bit 0=0.<br><br>Bit 5=TEST_CRC_SUPPORTED<br>0=CRC not supported by Sink Device<br>1=CRC supported by Sink Device<br><br>Bits 7:6=Reserved | Read only |
| 00270h | TEST_SINK<br><br>Bit 0=TEST_SINK_START<br>0=Stop calculating CRC on next frame<br>1=Start calculating CRC on next frame<br><br>Bits7:1=RESERVED. Read all 0's<br><br>Note: The CRC calculation is done on the entire frame. A 16 bit CRC is generated per color component based on the following polynomial: $f(x)=x^{16}+x^{15}+x^{2}+1$. The CRC calculation is only done on active pixels. The MSB is shifted in first. For any color format that is less than 16 bits per component, zero-pad the LSB. The following is an example of the CRC-16 generation. | Write/Read |

FIG. 9

AUTOMATED COMPLIANCE TESTING FOR VIDEO DEVICES

CROSS-REFERENCE TO RELATED APPLICATIONS

This application claims benefits from U.S. Provisional Patent Application No. 60/895,645 filed Mar. 19, 2007, the contents of which are hereby incorporated herein by reference.

FIELD OF THE INVENTION

The present invention relates generally to digital video devices, and more particularly to methods of automating certain test procedures that may be used to assess whether video devices perform as expected.

BACKGROUND OF THE INVENTION

Digital processing and presentation of information is now in wide spread use in the consumer electronics and personal computing industries. Video, audio and text are now digitally manipulated and presented in a variety of applications.

In particular, digital display terminals are fast becoming commonplace—rapidly replacing older analog devices such as cathode ray tube displays. Digital video transmission may take place between two integrated circuits in a given display device or between two external devices. Device-to-device digital video exchange may be observed between computers and monitors, set-top boxes and television displays, projectors and display terminals, and the like.

To facilitate flexible transmission of digital video data between a transmitting device and a receiver, various standards defining suitable communications are evolving. The current trends use a serial link, to carry one or more digital data streams.

The DisplayPort standard, for example, provides a high bandwidth (currently 2.7 Gbps per stream), multi-stream forward transmission channel across a data link, with a bit error rate (BER) of no more than $10^{-9}$ per stream. Each serial stream is referred to as a lane. DisplayPort further provides for a bi-directional auxiliary channel and an interrupt request line from the receiver to the transmitting device, to facilitate link training and the exchange of control data. Pixels in a digital video frame may be sent in parallel using symbols across all lanes. DisplayPort is more particularly described in The DisplayPort Standard v. 1.0, as published by the Video Electronics Standards Association (VESA), the contents of which are hereby incorporated by reference.

Conveniently, the format of the frames is flexible, to accommodate multiple different video formats. Each video format may have a different pixel resolution (number of pixels per line, number of lines per frame); color depth per pixel; color format; and the like.

At relatively high data rates, achieving the required BER may present multiple design challenges. At the same time, interoperability between devices requires that possibly interconnected devices provide video signals in a recognizable and standards compliant fashion for the multiple video formats.

Accordingly, each device design purporting to be interoperable and compliant with the standard may undergo rigorous standards compliance testing. In such testing, a test device is usually placed in different modes, each corresponding to a supported video format. In each mode typically, compliance of the received or provided video signal to the standard may be verified. As well, the establishment of the link, and the exchange of auxiliary data may be verified. Typically, all this is done manually, and is quite time consuming. It is particularly time consuming as the number of supported video modes, and link types and modes of operation increases.

Therefore, there remains a need to allow for more automated device testing.

SUMMARY OF THE INVENTION

In accordance with an aspect of the present invention, there is provided a method of providing a test signal by way of a video link from a video source to a video sink, the video link extending from a port on the video source the method comprising: receiving on the video link at the port a request from the video sink to provide the test signal; identifying based on the request, a requested test signal; providing the requested test signal from the video source to the video sink over the video link.

In accordance with another aspect of the present invention there is provided a method of testing a video sink comprising: providing a known video signal from a video source to the video sink over a video link; querying the video sink over the video link to determine a metric describing at least a portion of the video signal, as received and determined at the video sink; comparing the metric with an expected metric to verify integrity of the video signal at the video sink.

In accordance with yet another aspect of the present invention, there is provided a method of testing operation of a video source comprising:
a) requesting at the video source by way of a digital link, generation of a sequence of video signals representative of modes of operation of the video source;
b) providing each of the video signals over the link from the video source to a video sink;
c) verifying receipt of the video signal from the video source at the video sink.

In accordance with yet another aspect of the present invention, there is provided a video source comprising a transmit interface for providing a video signal to a video sink by way of at least one digital stream provided from a port of the video source, the video source further comprising a processor to provide a test signal by way of the port in response to a request for the test signal from the video sink by way of the link.

In accordance with yet another aspect of the present invention, there is provided a video sink comprising a receiver interface for receiving a video signal from a video source by way of at least one digital stream provided from a port of the video source, the video sink further comprising a controller to provide a test request signal by way of the link, and in response thereto receive a test signal from the video source by way of the link to verify operation of the video source.

In accordance with yet another aspect of the present invention, there is provided a video sink comprising a receiver interface for receiving a video signal from a video source by way of at least one digital stream provided from a port of the video source, the video sink further comprising a controller, that in response to a test request signal received from the video source over the video link, determines a metric of a received test signal, received by way of the link.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

FIG. 4A-4D are tables illustrating the format and significance of parameter data stored at the sink of FIG. 1;

FIG. 9 are tables illustrating the format and significance of test data stored at the sink of FIG. 8.

DETAILED DESCRIPTION

Figure 1:
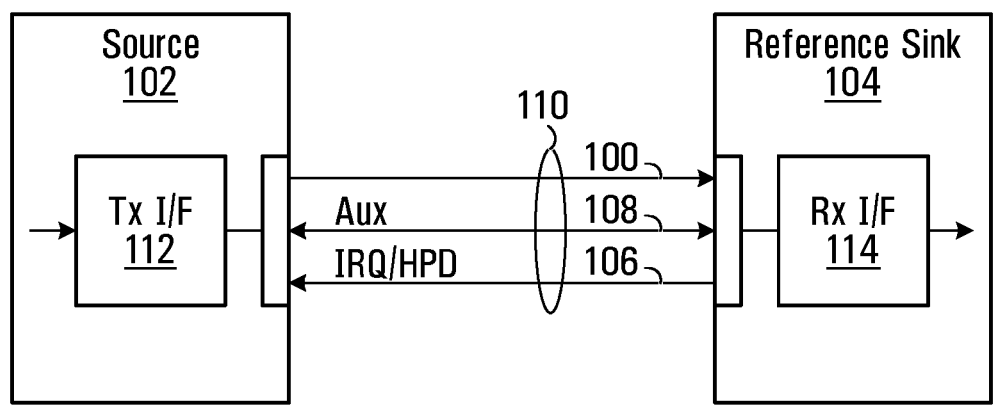
FIG. 1 is a block diagram of video source and video sink interconnected by a link carrying at least one serial stream, exemplary of embodiments of the present invention.

FIG. 1 is a simplified schematic block diagram of a digital video transmitter/receiver pair including a video source 102 and a video sink 104 interconnected by a serial link. As illustrated, a physical link 110 carries a main forward transmission channel 100 that may be used to send data from source 102 to sink 104, and a bi-directional auxiliary channel 108 that may be used by both source 102 and sink 104 to communicate status and control data between them. Link 110 may further carry an interrupt request (IRQ) line 106, to signal interrupts from sink 104 to source 102. Link 110 is suitable for the exchange of video and audio, and may for example be a DisplayPort compliant link. Link 110 may be interconnected between devices using a single physical connector at source 102 and sink 104, emanating at a port at source 102 and terminating at a port at sink 104. A transmit interface 112 formats data from a video, audio, or other multimedia data source for transmission over link 110. A complementary receiver interface 114 receives and decodes the received video, or other data.

In general applications, source 102 and sink 104 may be or form part of a digital video source, such as a personal video recorder, cable-television or terrestrial television receiver, DVD player, video game, computing device, or the like. Sink 104 could form part of a display, such as a liquid crystal display (LCD), plasma, surface-conduction electron-emitter display (SED), digital light processing (DLP) projector or panel, a or similar display. In the embodiment of FIG. 1, however, sink 104 is a reference sink that may specifically be used to test or verify the ability of source 102 to transmit signals by way of link 110. As such, sink 104 may be a test apparatus loaded with suitable test software, exemplary of an embodiment of the present invention. As will become apparent, source 102 conveniently allows for automated generation of test signals at the request of sink 104, in manners exemplary of embodiments of the present invention.

Figure 2:
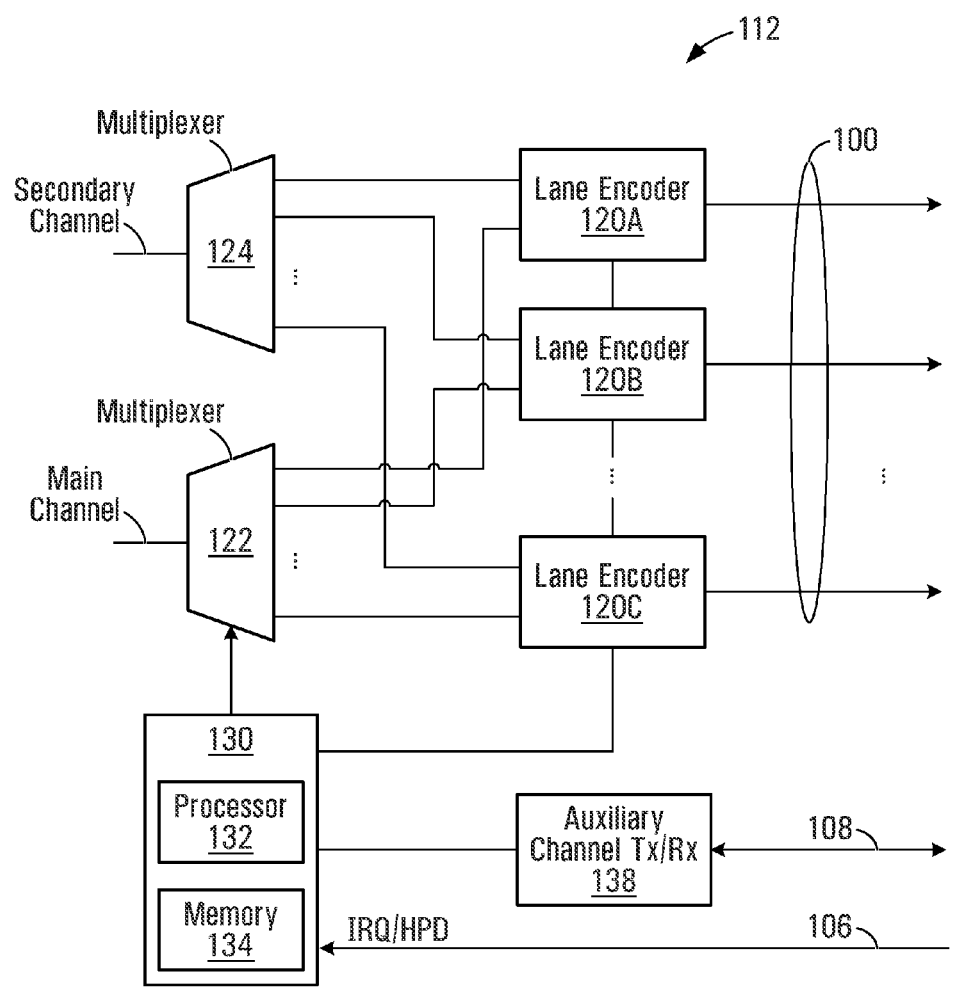
FIG. 2 is a simplified schematic diagram of a transmitter interface useable in the source of FIG. 1.

FIG. 2 is a simplified schematic block diagram of transmit interface 112 of source 102 of FIG. 1. The depicted source 102 transmits data as multiple serial streams. Each serial stream is often referred to as a lane. As such, transmit interface 112 includes at least one lane encoder(s) 120a, 120b, . . . 120c (individually and collectively lane encoders 120). A multiplexer 122 distributes a main channel—typically video—among the multiple lane encoders 120. An optional second multiplexer 124 distributes secondary data, such as audio, auxiliary data, and the like, among lane encoders 120. Each lane encoder 120 further formats serial data in each lane, which is serialized into a bit stream carried on link 110. Details of a suitable lane encoders and multiplexers may be found in U.S. patent application Ser. No. 11/678,925 or the DisplayPort Version 1.0 Specification.

Transmit interface 112 of source 102 further includes controller 130. Controller 130 controls overall operation of lane encoders 120, and may further be in communication with an auxiliary channel interface, in the form of a auxiliary channel encoder/decoder 138, to exchange control signals and auxiliary data between source 102 and sink 104.

Controller 130 may be formed as a general purpose processor 132 under software control stored in memory 134, as a general purpose programmable controller, an application specific integrated circuit (ASIC), or any other suitable electronic block or combination of blocks suitable for use as described, as appreciated by those of ordinary skill. Software, in this context, may include without limitation computer software in a format readable by processor 132, firmware, or any combination thereof, and may be loaded into computer readable memory from a suitable computer readable medium.

Auxiliary channel encoder/decoder 138 encodes and decodes data on bi-direction channel 108. Auxiliary channel encoder/decoder 138 may use any suitable serial protocol. In the depicted embodiment, auxiliary channel encoder/decoder 138 may encode data using a differential serial link, using for example, Manchester encoding. Other channel formats will be readily apparent to those of ordinary skill.

In particular, controller 130 may be operable to cause source 102 to produce test signals, and provide these to sink 104, in response to requests received from sink 104 over link 110.

More specifically, processor 132, under software control, monitors link 110, for possible test requests. A test request may take any suitable form, appreciated by those of ordinary skill. In the depicted embodiment, the test request may include an interrupt request, provided over interrupt request line 106. For example, interrupt request line 106 may be a hot plug detect (HPD) line and an interrupt request may take the form of a pulse of finite duration on the HPD line originating at sink 104. The HPD line typically signifies connection of source 102 to a sink, like sink 104. However, shorter pulses on the HPD line may be used to signal other interrupts. As will become apparent, the test request could similarly be provided over auxiliary channel 108, for example by way of a memory write to a monitored location.

In order to further particularize the test request, source 102 may request additional information from sink 104 to complete the test request. In particular, source 102 may query sink 104 using auxiliary channel 108. More specifically, source 102 may query memory, registers, or other storage elements, or may read memory locations at defined addresses at an interconnected corresponding sink, like sink 104. Source 102 may read and write to and from memory locations at sink 104 by providing suitable requests over auxiliary channel 108. These requests may be processed by controller 130. Of course, queries need not be by way of memory reads or writes, but could be performed as register read/writes, processor to processor communication, integrated circuit to integrated circuit communication or otherwise.

In order to distinguish an interrupt forming part of a request for a test signal, from other interrupts (or from detection of a hot plugged device) and the parameters associated with the request, source 102 may specifically read memory locations at known addresses at sink 104.

Figure 3:
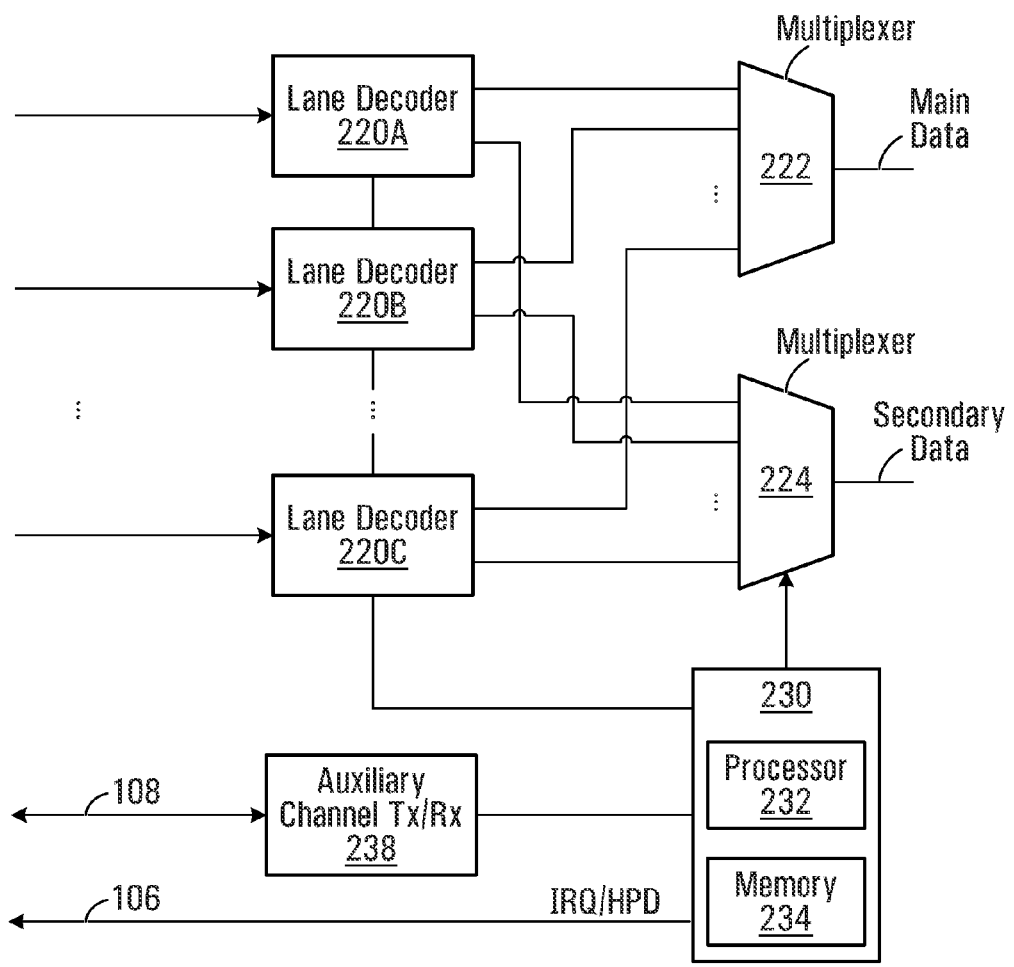
FIG. 3 is a simplified schematic diagram of a receiver interface useable in the sink of FIG. 1

A complementary receiver interface 114 at sink 104 is depicted in FIG. 3. As illustrated, receiver interface 114 includes at least one lane decoder 220a, 220b... (individually and collectively decoders 220). Each lane decoder 220 decodes a serial stream, encoded by a complementary lane encoder 120 (FIG. 2). The outputs of lane decoder(s) 220 feed (de)multiplexers 222 and 224 that separate main channel and secondary channel data decoded from the streams forming channel 100 on link 110. Downstream of receiver interface 114, the main data (typically video data) and secondary data may be further processed and presented on a display, or the like.

Receiver interface 114 of source 104 further includes controller 230. Controller 230, like controller 130 of transmit interface 112, controls overall operation of lane decoders 220, and may further be in communication with an auxiliary channel interface in the form of auxiliary channel encoder/decoder 238, to exchange control signals and auxiliary data between source 102 and sink 104.

Controller 230 may be formed like controller 130—as a general purpose programmable processor 232 under software control by software stored in memory 234, a general purpose programmable controller, an ASIC, or any other suitable electronic block suitable for use as described, as appreciated by those of ordinary skill. Software, in this context, may again include without limitation computer software in a format readable by processor 232, firmware, or any combination thereof, and may be loaded into computer readable memory from a suitable computer readable medium.

More specifically, processor 232 at sink 104, under software control may initiate testing at source 102, by providing specific test requests to source 102. As noted, a request may, for example, include an interrupt request signal, provided over interrupt line 106 by processor 232. A request may further include test parameters, specifying the nature of the interrupt and the test requested. These parameters are detailed below.

In the depicted embodiment, test parameters are stored by processor within memory 234, and queried by processor 132 over auxiliary channel 108. Of course, test parameters could be exchanged in a number of ways understood by those of ordinary skill.

To this end, FIGS. 4A-4D is a table illustrating reserved address allocation within memory 234 of sink 104, for use in performing tests at source 102. In the depicted embodiment, the reserved addresses are at address locations 00201h and 00218h to 00261h. The chosen addresses are, of course arbitrary. Any suitable addresses may be used, provided they may be written to/read, and are otherwise not in use.

Of note, bit 1 of location 00201h may be used to identify a test request to source 102, while locations 00218h to 00261h may be used to store test request parameters and test response values (if any).

Figure 5:
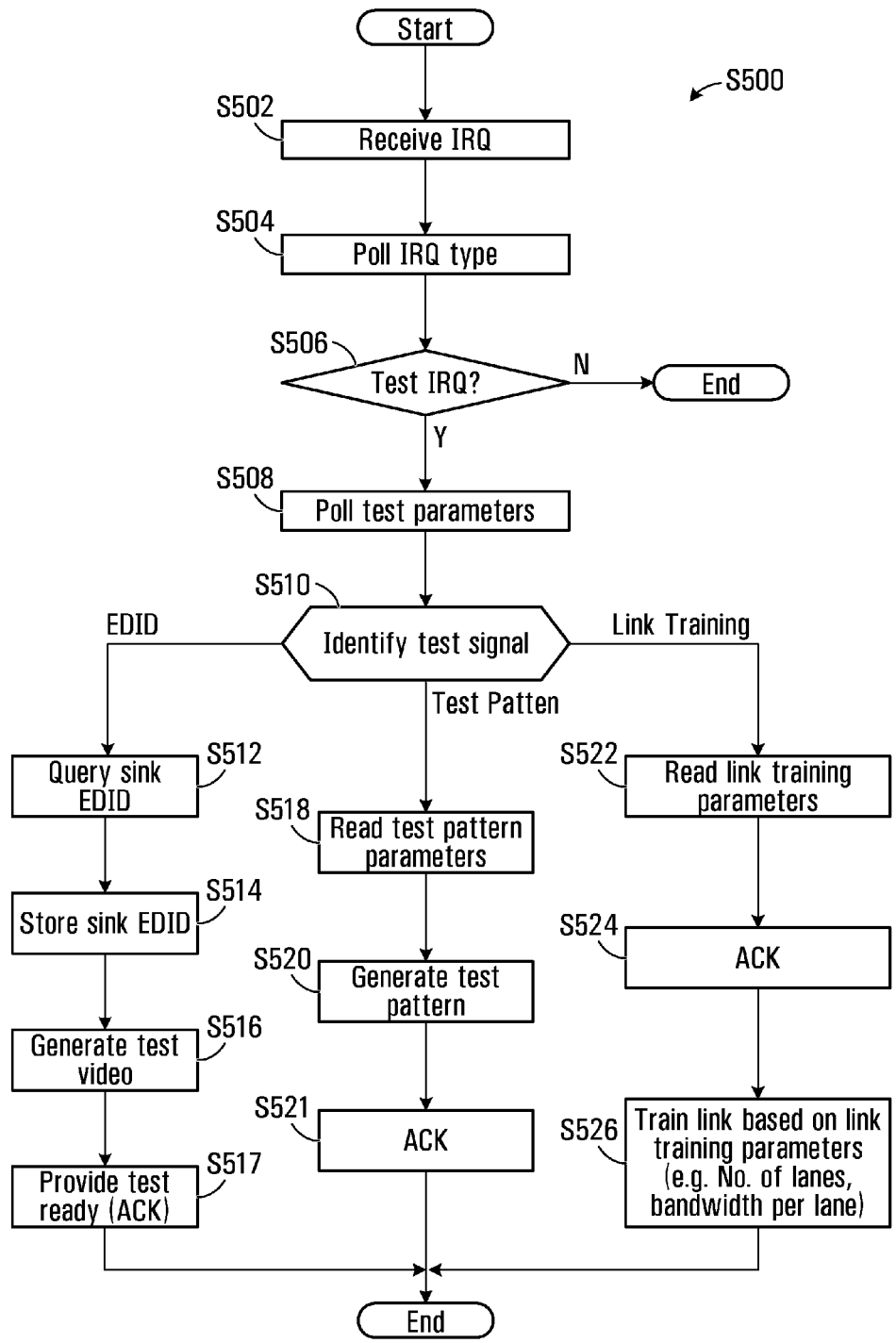
FIG. 5 is a flow chart illustrating blocks performed at the source of FIG. 1.
Figure 6:
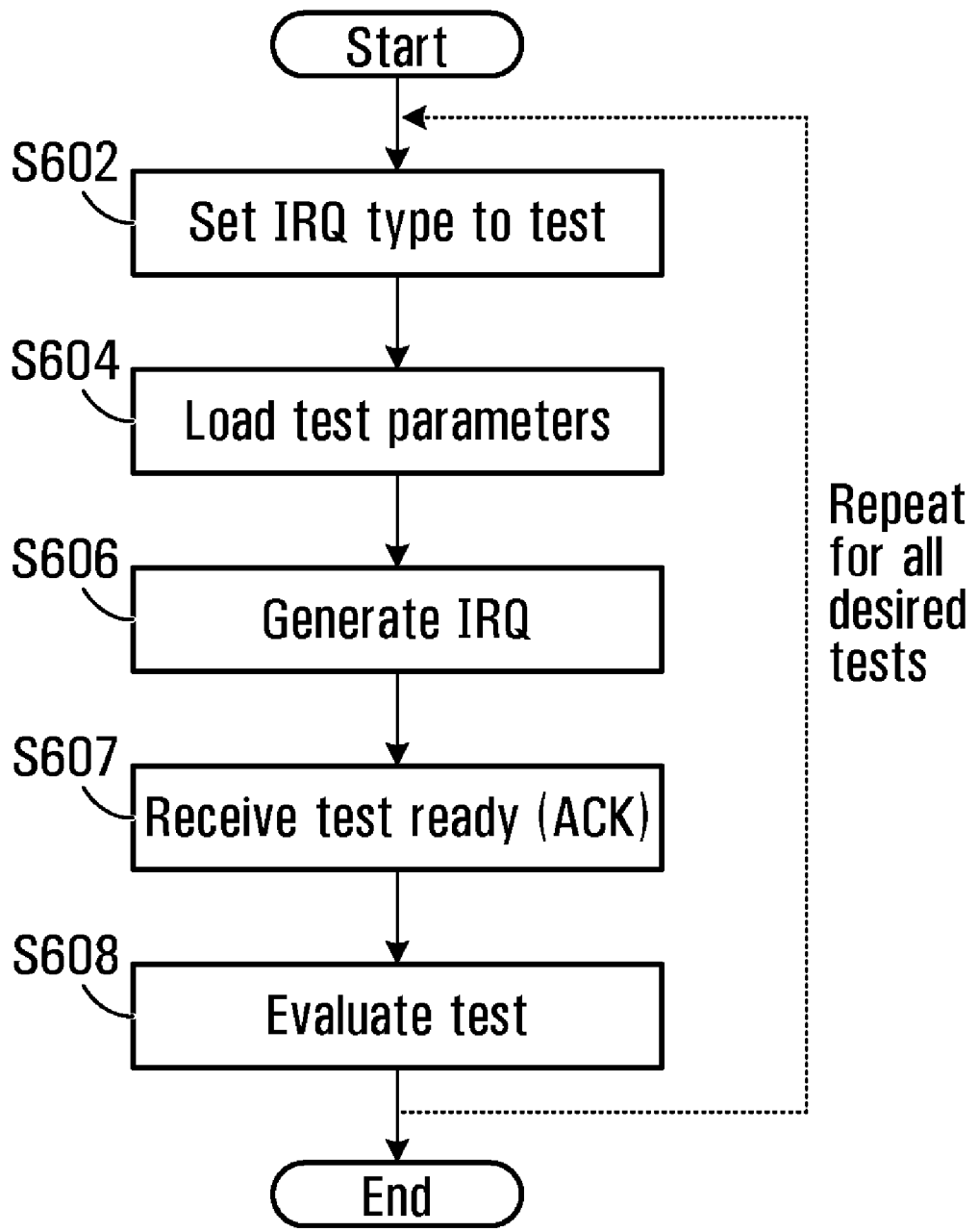
FIGS. 6 and 7 are flow charts illustrating blocks performed at the sink of FIG. 1.
Figure 7:
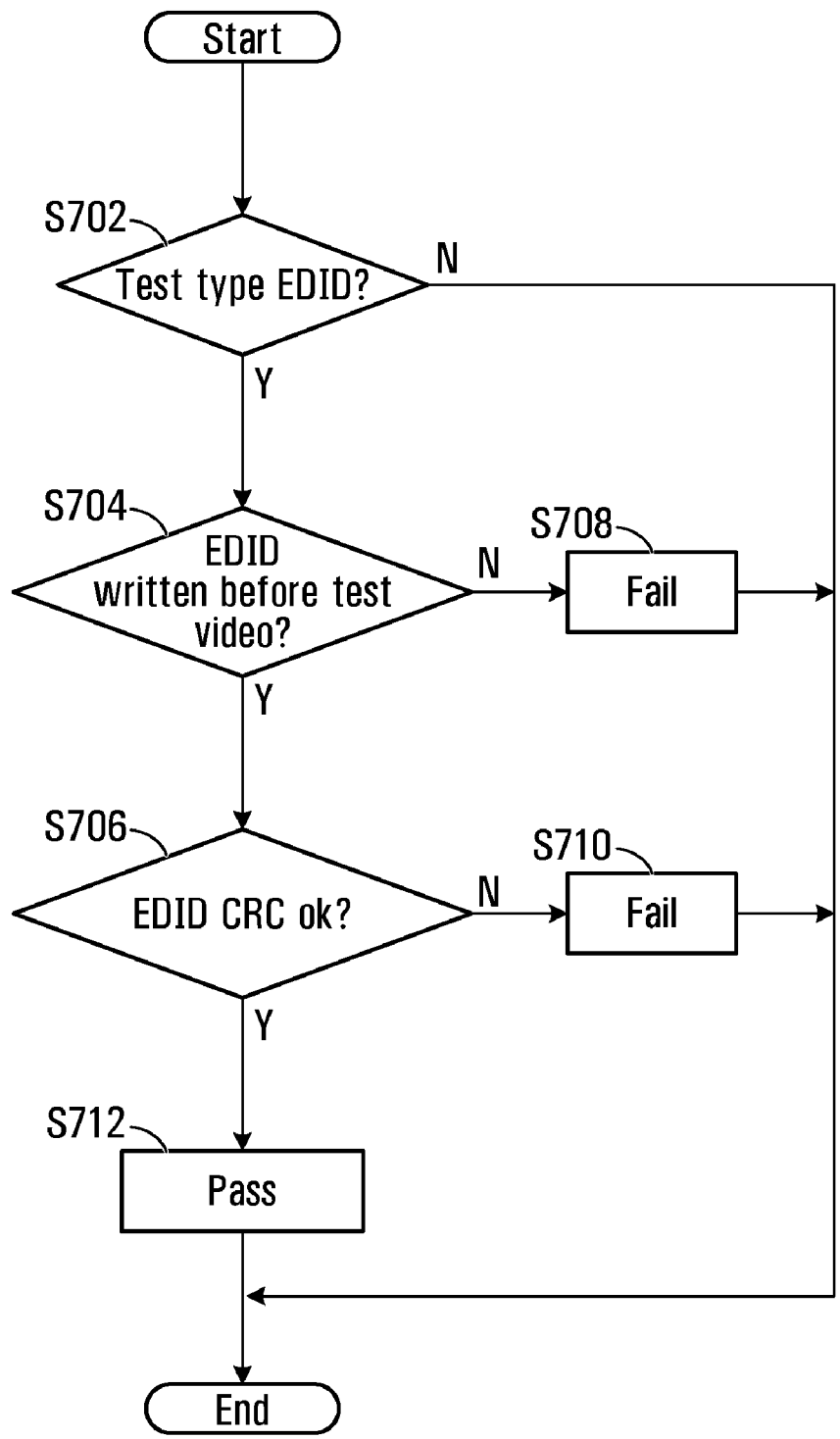

More specifically, FIG. 5 illustrates example software blocks S500, as executed by source 102, under control of controller 130, upon receipt of an interrupt signal from a sink, like sink 104 to provide test signals used in compliance testing. Complementary blocks to automate compliance testing, performed by a reference sink are illustrated in FIGS. 6 and 7.

For each test, sink 104 identifies the test as a test by setting the appropriate bit of location 00201h at source 104, to identify any ensuing interrupt request as part of a test request in block S602 (FIG. 6), loads test parameters to be queried in memory 234 in block S604, and generates an interrupt request corresponding to a request for a test signal in block S606.

At source 102, in block S502 (FIG. 5), source 102 receives the interrupt request, for example by way of interrupt line 106. In block S504 source 102 determines whether the interrupt request corresponds to a test request. This may be done by querying sink 104, for example, to assess whether bit 1 of location 00201h identifies the interrupt as a test request. If not, as determined in block S506, the interrupt signal is processed otherwise as not specifically detailed herein.

If the interrupt request corresponds to a test request, source 102 further queries sink 104 to obtain further test parameters, to more fully identify the test request. For example, selected locations between locations 00218h and 00234h in memory 234 of sink 104 may be read at source 102 over channel 108 to determine the type of test and associated parameters. To reduce memory reads across channel 108, locations 00218h to 00261h may be read/queried as a block in block S508, or along with location 00201h in block S504.

Notably, the interrupt request line 106 may be reasserted during an executing test (e.g. link training detailed below), to determine how source 102 reacts to the hot plug detect signal while providing test signals. The signal on the interrupt request line 106, or may not interrupt performance of an ongoing test.

Next, in block S510, controller 130 may identify the requested test signal. The test signal may, for example, be identified using the test request, including associated parameters queried from sink 104. In the depicted embodiment, sink 104 may request tests to perform link training; to provide a video test signal; or to ensure other inter-device communication is properly performed. Of course, other types of test could be requested by sink 104 and identified and responded to by source 102.

One form of inter-device communication that may be tested is the ability of source 102 to properly read device identification data that may be stored at sink 104. An example, automated test of inter-device communication is detailed in FIG. 5 The device identification data may for example be stored in memory 234, in compliance with the extended display identification data (EDID) specification. As such, if the test request identifies a request to test inter-device communication (typically referred to as an EDID read—specified at sink 104 in block S604, as bit 2 of 00218h=1), source 102 may perform a read of information and sink 104, and provide a test signal including data derived from the read over auxiliary channel 108. Specifically, source 102 may read the identification information in a defined manner in block S512. The device information may be EDID information, identifying such things as the capabilities, model number, etc. of sink 104, and is also received at source 102 in block S512.

Once received, the read identification information or a metric thereof may be calculated and/or stored. The metric may be a checksum, in the form of a CRC using a known CRC polynomial, hash function or the like, or any other suitable metric of the read device identification information. The read identification information or the metric may be written within memory at source 102 and/or to memory at sink 104, using auxiliary channel 108 in block S514. The identification information or metric may be verified by sink 104, in block S608 (FIG. 6), for example in block S706, depicted in FIG. 7.

As well, source 102 may optionally generate a test video signal in block S516, after any write of checksum, or the like to sink 104 is complete. In order to confirm that the test signal has or is being provided, source 102 may further signal an acknowledgement to sink 104 in step S517. The acknowledgement signal may be in the form of a test ready acknowledgement signal (ACK) written to a suitable location at sink 104 (e.g. bit 0 of 00260h), by source 102 using auxiliary channel 108. Sink 104 may confirm that the video signal does not appear until after the acknowledgement is present in block S607, and that the metric has been correctly written in block S704 of block S608. As will be appreciated, an explicit acknowledgement as described could be replaced with an implicit acknowledgement signal—for example, the provision of a test video signal could imply writing of a metric. In any event, if the provided metric is incorrect, or the video appears too early as determined in S706 or S704, the test may be noted or signalled as failed.

Processing of a request for a test signal including a test pattern is detailed in FIG. 5. For example, if the test request identifies a request for a test pattern (e.g.—specified at sink 104 in block S604 by populating bit 1 of address 00218h=1), as determined in S510 a test pattern as further specified in block S604 in addresses 00221h to 00233h may be identified and generated, by loading suitable test patterns from memory 234 at sink 104 and providing these to source 102 over link 110, in step S518. Example test pattern parameters may include the desired test pattern type (e.g. color ramps as specified by VESA, black and white vertical lines, or color squares, as specified by CEA); the test pattern horizontal and vertical size; the start of the active pattern, the horizontal and vertical synch width; and the horizontal and vertical size of the active pattern, as more particularly detailed in FIG. 3. At the same time, the number of bits per pixel, bits per color component, and color format (e.g. RGB, YCbCr, etc.) may be specified.

As required, the test pattern, or a template therefor may be stored in memory 134 at source 102, or in another memory (not shown) and provided by way of a video data carrying channel on channel 100. Optionally, the test pattern could be rendered or otherwise produced by processor 132 or another processor, integrated circuit, (not shown), or otherwise, as appreciated by those of ordinary skill. The test pattern is provided by source 102 to sink 104 in block S520. Additionally, an indicator that the test pattern is being provided may be provided by source 102—again by providing acknowledgement to sink 104 in step S521. Again, the acknowledgement may be implicit, or in the form of a test ready acknowledgement signal (ACK) written to a suitable location at sink 104 (e.g. bit 0 of 00260h), by source 102 using auxiliary channel 108.

Once an acknowledgement that the test signal is or has been provided, is recognized at sink 104 in step S607, the provided test pattern may be manually evaluated. Alternatively, proper receipt could be otherwise validated by comparing attributes of the test pattern to known attributes at sink 104. Sink 104 could, for example, compare the received test pattern to a stored pattern; perform a checksum of the received test pattern; or otherwise perform a credible comparison to an expected test pattern result. If the received video test pattern does not compare to expectations (as assessed by sink 104) or manually, the test may be noted as failed.

If the test request identifies a request for link training (e.g. identified in at sink 104 in block S604 by setting bit 0 of address 00218h=1), as assessed in block S510, link training is performed as detailed in FIG. 5. Link training, is for example, more particularly detailed in the DisplayPort Ver. 1.0 Specification. Link training is used to establish and synchronize transmission of one or more serial streams on link 110, so that they may be properly received and decoded by lane decoders 220 at a receiver interface 114. Parameters of the desired link (e.g. number of lanes/serial streams and rate), to be trained during the test, and the link training test pattern may be specified, as part of the test request, by sink 104. Again, these test parameters may be specified at sink 104. Specifically, sink 104 in block S604 may populate locations in memory 234 used to maintain TEST_LANE_COUNT (00220h), TEST_LINK_RATE (0219h), TEST_PATTERN (0221h)) with the desired link width (number of streams) and link rate respectively. Source 102 reads link training parameters in block S522, and begins link training at the requested link width and link rate in block S526. Again, provision of the test signal—in the form of a link training test pattern—may be acknowledged by source 102 in block S524—by for example writing a test ready acknowledgement signal (ACK) to a suitable location at sink 104 (e.g. bit 0 of 00260h), using auxiliary channel 108. Again, the presence of the test signal may be recognized at sink 104 in step S607. Optionally, sink 104 may alter link training parameters, such as equalization, drive current, pre-emphasis, and other training parameters that may typically be varied, in order to ensure that source 102 can properly train and establish the link, in the presence of such parameter alteration. Proper training of the link may be verified after a defined interval in block S608 by verifying that the source 102 has signaled link training. This may, for example, be performed by source 102 writing the trained link pattern to a reserved memory location at the sink 104 (e.g. a location reserved for this purpose for conventional link training—TRAINING_PATTERN_SET, as specified in the DisplayPort Specification).

The test signal (e.g. test pattern) may be provided once, or for a defined interval, whether that interval is measured in frames, or seconds, or the like, or it may be provided until a subsequent request for a new test signal is received.

Conveniently, software at sink 104 may sequentially automatically perform a variety of tests, possibly all those required to assure compliance with the specification, to ensure that source 102 is properly functioning. For example, software at sink 104 may request test patterns in all supported video modes; perform a variety of link training tests—including testing training of all available links at supported speeds, link training in the presence of an asserted HPD line; link training at less than maximum rates; link training in the presence of symbol loss; and the like. Software controlling operation of processor 232 or other software controlling operation of a host processor can cause blocks S602 and onwards to be repeated for a variety of tests and test parameters to ensure compliance of source 102.

Figure 8:
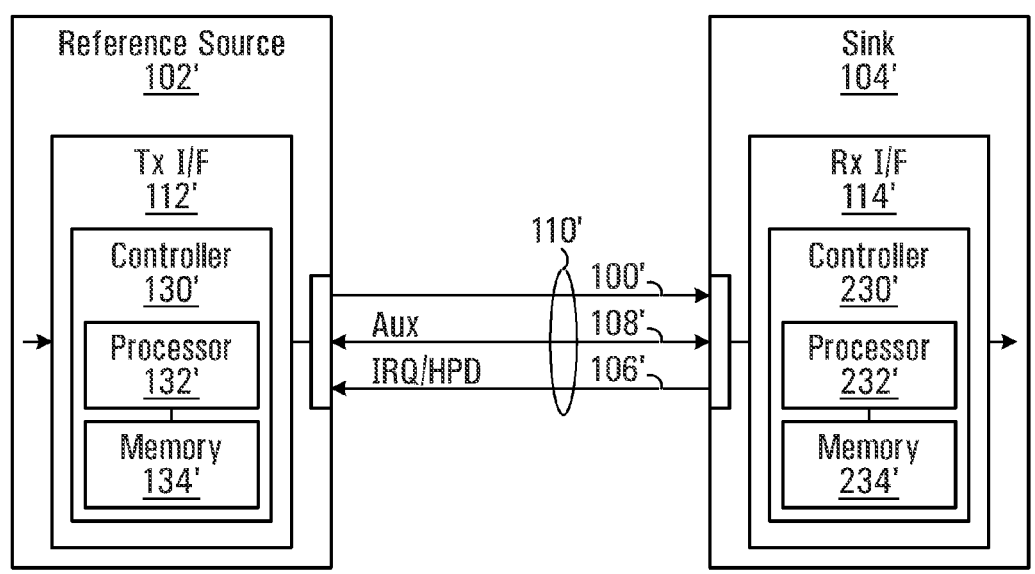
FIG. 8 is a block diagram of video source and video sink interconnected by a link carrying at least one serial stream, exemplary of additional embodiments of the present invention.

In an alternate embodiment, depicted in FIG. 8, a reference source 102' is interconnected with a sink 104', by way of link 110'. Link 110' is the same as link 110. Source 102' and sink 104' are substantially like source 102 and sink 104. However, in this embodiment, reference source 102' may initiate tests at sink 104' by providing suitable requests for test signals. As such, sink 104' may be a conventional video sink, such as a display panel, video monitor, video processor, a computer graphics adapter, or the like, modified in manners exemplary of embodiments of the present invention.

Components forming source 102' and sink 104' are generally same as their counterparts of source 102 and sink 104, and will therefore not again be described in detail. Source 102' and sink 104' may however differ from source 102 and 104 as a consequence of the software or firmware used to control their operation. For ease of explanation, components corresponding to those of source 102 and sink 104 in source 102' and 104', have been marked corresponding numerals and a prime (') symbol.

Specifically, software in memory 234' at sink 104' may allow sink 104' to respond to test signals provided by source 102', to allow source 102' to verify proper receipt and/or processing of the test signals at sink 104'. Likewise, source 102' may provide requests for such responses, and evaluate received test signals at sink 104'. Source 102' may thus be considered a reference source and may, for example, be a test apparatus used in automated compliance testing of video sinks, like sink 104'.

More specifically, processor 232' of sink 104' under software control monitors its memory 234' for test requests, requiring source 104' to respond to a particular known test signal. A test request in this context, takes the form of a write to memory 234' by source 102' over channel 108'. Such a memory write may again be made by way of write command over auxiliary channel 108', in the same was as source 102 writes memory addresses at sink 104 over auxiliary channel 108, described above.

More specifically, processor 132' at source 102' under software control may initiate testing at sink 104', by writing to a monitored memory location at sink 104'. Once a test is complete, source 102' may further read contents of additional memory locations at sink 104' to verify successful completion of the test.

To this end, FIG. 9 is a table illustrating reserved memory address allocation within memory 234' of sink 104', for use in performing tests at sink 104'. In the depicted embodiment, the reserved addresses are at address locations 00270h and 00240h to 00246h. The chosen addresses are, of course again arbitrary. Any suitable addresses may be used, provided they may be written to/read, and are otherwise not in use.

Of note, bit 0 of location 00270h may be used by source 102' to provide a test request to sink 104', while locations 00218h to 00261h may be used by sink 104' to store test response values (if any). Bit 0 of location 00270h thus functions as a test request flag at sink 104'.

Figure 10:
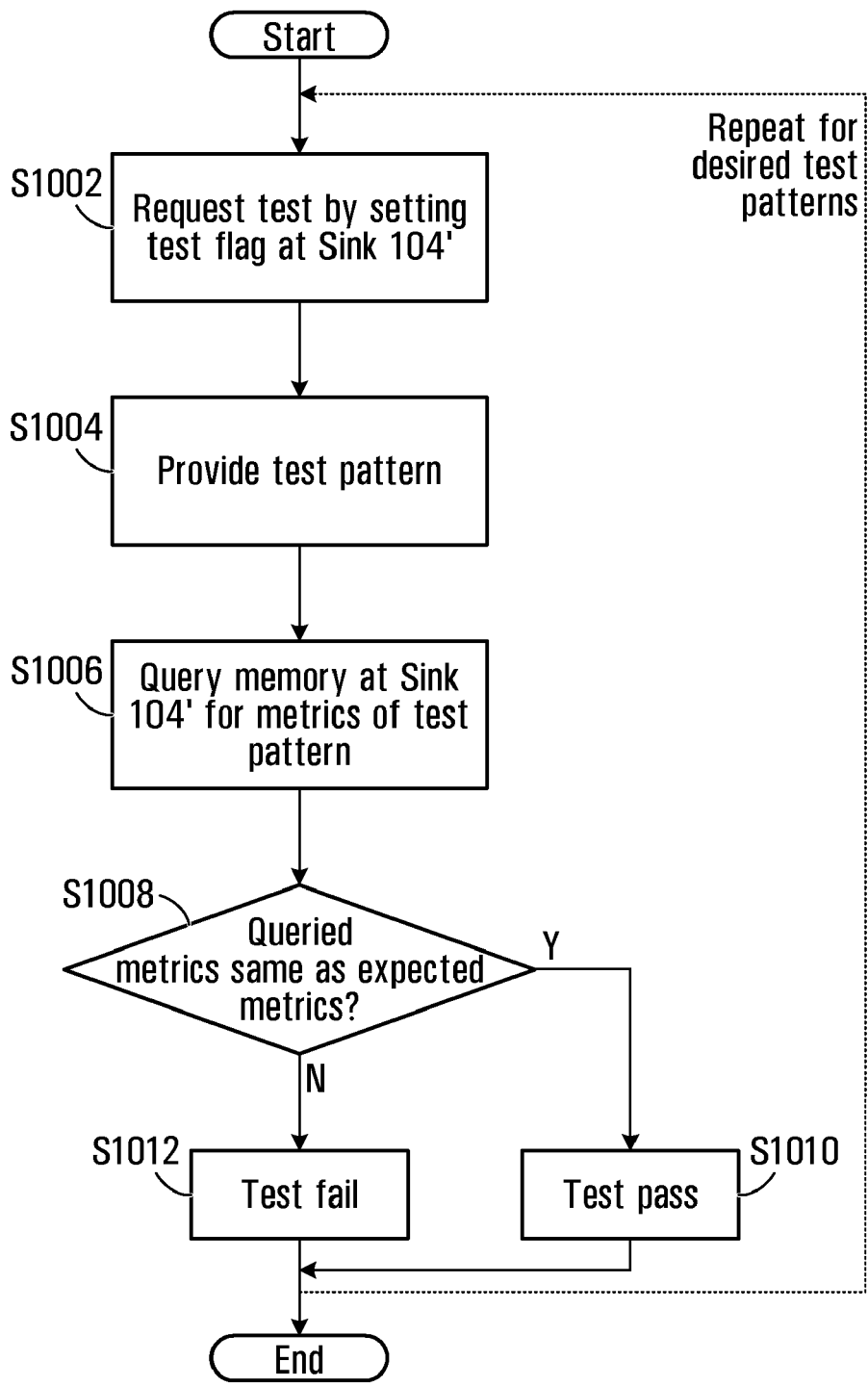
FIGS. 10 and 11 are flow charts illustrating blocks performed at the source and sink of FIG. 8.
Figure 11:
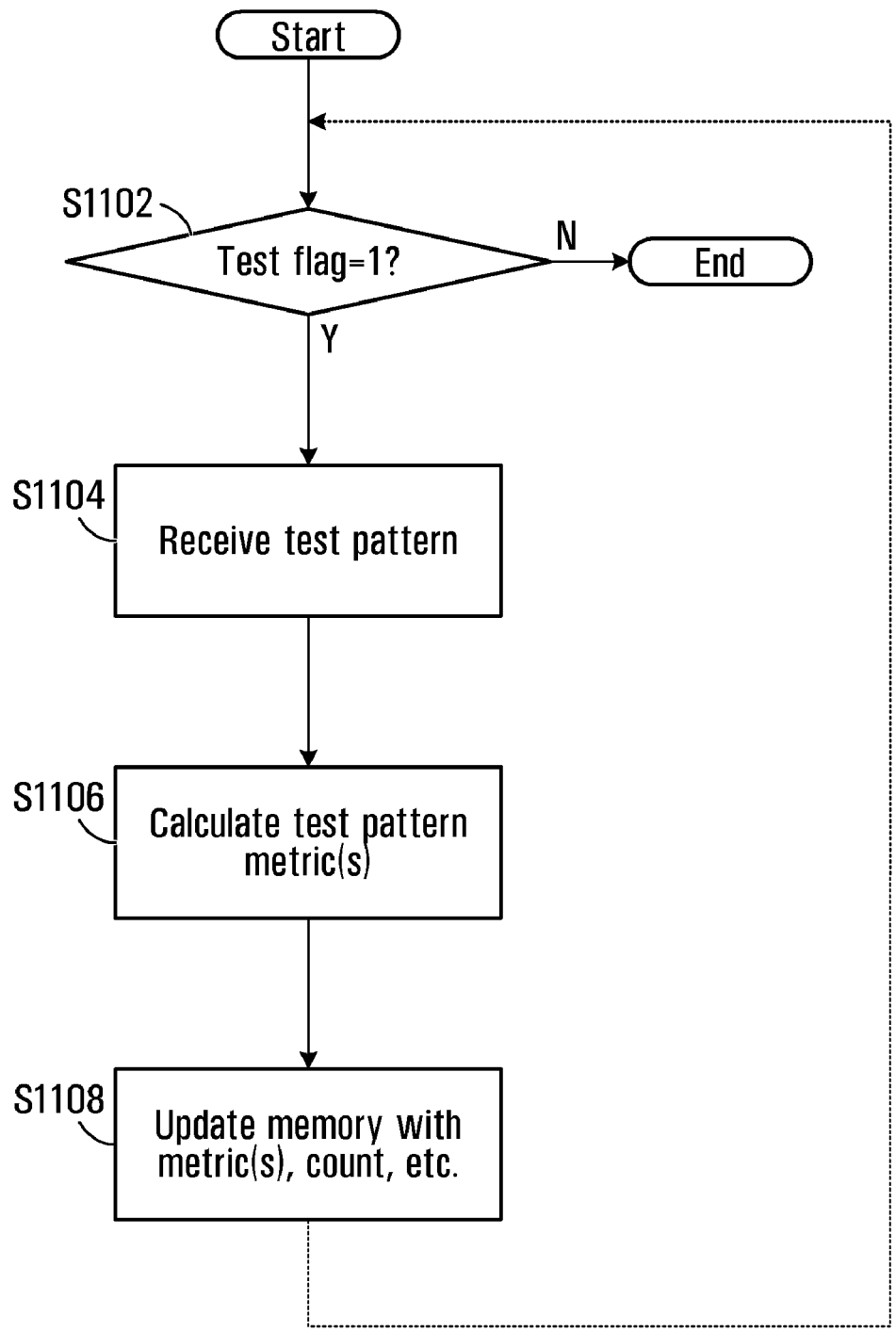

FIG. 10 depicts exemplary blocks performed by source 102' in performing a test, exemplary of an embodiment of the present invention. Complementary blocks performed by sink 104' are depicted in FIG. 11.

Specifically, as illustrated in block S1002 source 102' under software control may initiate an automated test by providing a test request, by for example setting a memory location at sink 104'. Specifically, bit 0 of memory location 00270h of sink 104' may be set by source 102' using auxiliary channel 108'.

Typically, prior to providing the test request, a known test pattern to be provided to sink 104' has been chosen at source 102'. As well, as will become apparent, metrics of the test pattern to be verified should be calculated at source 102'. The test pattern may be as described above, and its parameters may be chosen by software at source 102'.

Sink 104' may monitor its memory to determine whether or not a test request has been provided. In the presence of a detecting a set test flag (e.g. bit 0 of 00270h) at sink 104' in block S1102, sink 104' expect receipt of a test pattern in block S1104. Typically, the next received frame of video received by way of link 110' will be considered the test pattern.

Upon receipt of the test pattern in block S1104, processor 232' may calculate one or more metric(s) of the test pattern in block S1106. For example, processor 232' may calculate the CRC of the test pattern, and/or multiple CRCs of portions thereof, using conventional CRC polynomials. More specifically, sink 104' may calculate the CRC of each colour plane (i.e. RGB planes) of the test pattern, as received. Calculated metrics may be stored at sink 104', in block S1108 (e.g. stored in locations 00240h to 00245h), as detailed in FIG. 9. Optionally, with each frame for which a metric is calculated, a counter may also be updated in block S1008 (e.g. stored in location 00246h). Blocks S1102 and onward could be performed once, or repeated until the test flag is no longer set.

Back at source 102', the metric to be calculated at sink 104' may also be calculated. Typically this is done as the test pattern is being provided, or prior to block S1002 or at any other suitable time. The test pattern may be provided in block S1004. After the pattern has been provided for one or more frames, source 102' may query sink 104' to determine the value of the metric calculated by sink 104' in block S1006. This may again, be performed by a memory read by source 102' of memory at sink 104', over auxiliary channel 108'. Sink 104', in turn, provides the values stored in the requested locations (e.g. 00240h-00246h), as described above. These may also be received in block S1006 at source 102'.

Upon receipt of the metric, source 102' may compare the received values with those previously calculated in block S1008. If correct, the test at sink 104' has passed and an appropriate indicator may be stored or otherwise signalled at source 102' in block S1010. By contrast, if the pre-calculated metric does not match the provided metric, the test may be failed in block S1012. Tests may be repeated, as desired, for multiple test patterns by performing blocks S1002 and onwards for different test patterns.

Upon conclusion of each test, the test request flag (e.g. memory location 00270h) at sink 104' may be toggled, either by sink 104' in response to providing the requested test metrics received in block S1006, or explicitly by source 102' upon receipt of such test signal.

In this way, operation of sink 104' may be tested automatically by a suitable reference source. Again, a variety of supported video modes may be tested by repeating the test over numerous test patterns provided by reference source 102'.

As will now be appreciated, although source 102/102' and sink 104/104' have been specifically described with reference to DisplayPort compliant devices, embodiments of the inventions could easily be used with other digital video links and protocols. For example, automated testing could be used with high definition multimedia interface ("HDMI") compliant links and devices, or the like.

Alternatively, the video link could be provided optically or wirelessly. Ports may be logical or physical.

As well, while several specific tests are detailed above, source 102 and/or sink 104' could be modified to readily identify a variety of other requested tests—including tests directed to testing auxiliary channel 108, audio data, secondary data, and the like.

Of course, the above described embodiments are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A method of providing a test signal by way of a video link from a video source to a video sink, said video link extending from a port on said video source, said method comprising:
   receiving on said video link at said port a request from said video sink to provide said test signal, said request comprising an interrupt signal originating with said video sink, over an interrupt signal line;
   identifying based on said request, a requested test signal;
   providing said requested test signal from said video source to said video sink over said video link.

2. The method of claim 1 wherein said video link provides a video signal from said video source to said video sink by way of at least one stream.

3. The method of claim 2, wherein said video link comprises an HDMI compliant link.

4. The method of claim 2, wherein said video link comprises a DisplayPort compliant link.

5. The method of claim 1, wherein said request comprises an interrupt signal carried on a hot plug detect line from said video sink.

6. The method of claim 1, wherein said test signal comprises a chosen one of a plurality of video test signals provided by said video source.

7. The method of claim 6, wherein each of said plurality of video test signals reflects a different operating mode of said video source.

8. The method of claim 1, wherein said identifying further comprises querying said video sink to choose said test signal at said video source.

9. The method of claim 8, wherein said querying further comprises reading test parameters of said test signal to be provided from said video sink.

10. The method of claim 9, wherein said test parameters comprise at least one of a video timing parameter; a video color format; and a video test pattern.

11. The method of claim 1, further comprising providing second and subsequent test signals in response to receiving second and subsequent requests from said video sink over said video link.

12. The method of claim 1, wherein said video sink comprises a compliance test apparatus.

13. A method of testing operation of a video source comprising:
   a) receiving at said video source by way of a digital link, a request from a video sink to perform a test, said request comprising an interrupt signal originating with said video sink;
   b) requesting at said video source by way of said digital link, generation of a sequence of video signals representative of modes of operation of said video source;
   c) providing each of said video signals over said link from said video source to said video sink;
   d) verifying receipt of said video signal from said video source at said video sink.

14. The method of claim 13, wherein said digital link carries said video signals by way of at least one serial stream.

15. The method of claim 13, wherein each of said sequence of video signals comprises a test pattern.

16. A video source comprising a transmit interface for providing a video signal to a video sink by way of at least one digital stream provided from a port of said video source, said video source further comprising a processor to provide a test signal by way of said port in response to a request for said test signal from said video sink by way of an interrupt signal line, said request comprising an interrupt signal originating with said video sink.

17. The video source of claim 16, further comprising a channel interface to query at said video sink, parameters of said test signal to be provided.

18. A method of providing a test signal by way of a video link from a video source to a video sink, said video link extending from a port on said video source, said method comprising:
   receiving on said video link at said port a request from said video sink to provide said test signal;
   identifying based on said request, a requested test signal;
   providing said requested test signal from said video source to said video sink over said video link, wherein said test signal comprises a link training pattern for establishing a link from said video source to said video sink.

19. A method of providing a test signal by way of a video link from a video source to a video sink, said video link extending from a port on said video source, said method comprising:
   receiving on said video link at said port a request from said video sink to provide said test signal;
   identifying based on said request, a requested test signal;
   providing said requested test signal from said video source to said video sink over said video link;
   wherein said video link transports a plurality of streams forming a forward channel, a bi-directional serial channel for the exchange of control data and an interrupt signal.

20. A method of providing a test signal by way of a video link from a video source to a video sink, said video link extending from a port on said video source, said method comprising:
   receiving on said video link at said port a request from said video sink to provide said test signal;
   identifying based on said request, a requested test signal;
   providing said requested test signal from said video source to said video sink over said video link, wherein said test signal comprises a metric derived by said video source from identification information read from said video sink.

* * * * *